US010828961B2

(12) United States Patent
Renault

(10) Patent No.: US 10,828,961 B2
(45) Date of Patent: Nov. 10, 2020

(54) APPARATUS AND METHOD FOR THERMAL EVENT DETECTION IN A TRANSPORT REFRIGERATION UNIT

(71) Applicant: Carrier Corporation, Palm Beach Gardens, FL (US)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/477,287

(22) PCT Filed: Jan. 27, 2017

(86) PCT No.: PCT/IB2017/000196
§ 371 (c)(1),
(2) Date: Jul. 11, 2019

(87) PCT Pub. No.: WO2018/138540
PCT Pub. Date: Aug. 2, 2018

(65) Prior Publication Data
US 2020/0032721 A1    Jan. 30, 2020

(51) Int. Cl.
*B60H 1/32* (2006.01)
*F02D 17/04* (2006.01)
(Continued)

(52) U.S. Cl.
CPC ....... *B60H 1/00978* (2013.01); *B60H 1/3226* (2013.01); *B60H 1/3232* (2013.01); *F02D 17/04* (2013.01); *F02D 41/22* (2013.01)

(58) Field of Classification Search
CPC .............. B60H 1/00978; B60H 1/3226; B60H 1/3232; B60H 1/3228; B60H 1/32281; B60H 1/32884; F02D 17/04; F02D 41/22
See application file for complete search history.

(56) References Cited

U.S. PATENT DOCUMENTS 4,217,764 A * 8/1980 Armbruster .......... B60H 1/3226
62/239
5,172,561 A    12/1992 Hanson et al.
(Continued)

FOREIGN PATENT DOCUMENTS

EP    0522847 A2    1/1993
EP    2226775 A2 *  9/2010 ............. G01K 3/005
EP    2226775 A2    9/2010

OTHER PUBLICATIONS

International Search Report and Written Opinion for application PCT/IB2017/000196, dated Nov. 6, 2017, 10 pages.
(Continued)

Primary Examiner — Jacob M Amick
(74) Attorney, Agent, or Firm — Cantor Colburn LLP

(57) ABSTRACT

A system and method for thermal event detection in a transport refrigeration unit that includes a safety controller (302) communicatively coupled to a linear heat detector (304) affixed to a hood (202) of the transport refrigeration unit. The safety controller is configured to detect a change in resistance of the linear heat detector and initiate an action like shutting off the fuel supply to an internal combustion engine inside the compartment. The linear heat detector is operative to create, subsequent to being exposed to a temperature greater than or equal to a threshold temperature in the interior compartment (208), a change in resistance along at least a portion of the linear heat detector. The safety controller is further configured to initiate an action upon having detected the change in resistance.

20 Claims, 3 Drawing Sheets

(51) Int. Cl.
*F02D 41/22* (2006.01)
*B60H 1/00* (2006.01)

(56) References Cited

U.S. PATENT DOCUMENTS

| | | | |
|---|---|---|---|
| 5,201,186 A * | 4/1993 | Hanson | B60H 1/3225 |
| | | | 123/198 D |
| 6,130,487 A | 10/2000 | Bertalan et al. | |
| 6,216,479 B1 | 4/2001 | Elwood | |
| 6,336,593 B1 | 1/2002 | Bhatnagar | |
| 6,471,486 B1 | 10/2002 | Centers et al. | |
| 7,421,850 B2 | 9/2008 | Street et al. | |
| 7,648,342 B2 | 1/2010 | Jayanth | |
| 8,393,169 B2 | 3/2013 | Pham | |
| 8,590,325 B2 | 11/2013 | Pham | |
| 8,964,338 B2 | 2/2015 | Wallis et al. | |
| 9,121,407 B2 | 9/2015 | Pham | |
| 2013/0342948 A1 | 12/2013 | Jankowski et al. | |
| 2014/0144164 A1 | 5/2014 | Steele et al. | |
| 2015/0349519 A1 | 12/2015 | Li et al. | |

OTHER PUBLICATIONS

Kingtec, "Kingtec K598DE Diesel Transport Refrigeration Unit", available at: http://www.kingtec-canada.com/diesel-driven/k598de-diesel/, accessed Jul. 1, 2019, 4 pages.

* cited by examiner

APPARATUS AND METHOD FOR THERMAL EVENT DETECTION IN A TRANSPORT REFRIGERATION UNIT

TECHNICAL FIELD OF THE DISCLOSED EMBODIMENTS

The presently disclosed embodiments generally relate to transport refrigeration units, and more particularly, to an apparatus and method for detecting thermal events in transport refrigeration units.

BACKGROUND OF THE DISCLOSED EMBODIMENTS

Heat engines are designed to convert one form of energy into mechanical energy to do mechanical work. For example, internal combustion engines intake an oxidizer (e.g., atmospheric oxygen, compressed air/oxygen, nitrous oxide, etc.) and fuel (e.g., petroleum, natural gas, etc.) to create heat/thermal energy via combustion of the fuel and oxidizer, and convert the heat/thermal energy into mechanical energy. In doing so, varying amounts of heat are generated both in the operation of the engine components and through exhaust gases output from the engine as a byproduct of the combustion process.

In certain applications, exhaust after-treatment components are implemented to control toxic gas emissions, reduce/remove particulate matter, etc. For example, a catalytic converter may be used in the exhaust system to reduce carbon monoxide, hydrocarbons, nitrous oxide, and other gaseous or particulate matter emissions. To perform properly, such exhaust after-treatment components typically require that they be operated at least a portion of the time at high temperatures.

Operation of the engine and exhaust after-treatment system components at such high temperatures can result in a thermal event, such as an engine compartment fire. Despite efforts to protect such components in the engine compartment, including complete thermal insulation, a thermal event may still occur, which could result in significant mechanical/financial damages. Therefore, there is a need for an improved apparatus and method for thermal event detection in transport refrigeration units.

SUMMARY OF THE DISCLOSED EMBODIMENTS

One aspect comprises a transport refrigeration unit to cool an interior compartment of a container fluidly coupled to the transport refrigeration unit that includes a power system to provide power to the transport refrigeration unit comprising an engine; an exhaust system to expel exhausted air from the engine; a fuel supply system to transfer fuel to the engine via a fuel supply hose, and a thermal event detection system comprising: a safety controller; and a linear heat detector communicatively coupled to the safety controller, wherein the linear heat detector is operative to create, subsequent to being exposed to a temperature greater than or equal to a threshold temperature, a change in resistance along at least a portion of the linear heat detector, wherein the change in resistance is detectable by the safety controller, and wherein the safety controller is operative to initiate an action upon having detected the change in resistance In some embodiments, to initiate the action comprises to transmit, in response to having detected the change in resistance of the linear heat detector, a command to the shut-off valve that is usable to turn the shut-off valve into an off position to shut-off transfer of fuel to the engine. In other embodiments, to initiate the action comprises to transmit, in response to having detected the change in resistance of the linear heat detector, a notification to an on-board diagnostic communicatively coupled to the safety controller, wherein the notification is usable by the on-board diagnostic to indicate that the thermal event was detected by the safety controller. In still other embodiments, the linear heat detector is a two-core cable terminated by an end-of-line resistor. In yet other embodiments, to create the change in resistance comprises to create a short in the two-core cable.

In some embodiments, the threshold temperature is within a range of approximately 120° Celsius and approximately 130° Celsius. In other embodiments, the threshold temperature is approximately 125° Celsius. In still other embodiments, the engine comprises an internal combustion engine. In yet other embodiments, the linear heat detector is affixed to an internally-facing side of a hood of the transport refrigeration unit. In still yet other embodiments, a first region surrounding the fuel supply system comprises a first hot zone and a second region surrounding the exhaust system comprises a second hot zone, and wherein the linear heat detector is affixed to the hood of the transport refrigeration unit such that the linear heat detector is overlaid over each of the first and second hot zones when the hood is in a closed position.

In another aspect, a method for detecting a thermal event in a transport refrigeration unit includes detecting, by a safety controller of a thermal event detection system of the transport refrigeration unit, a change in resistance of a linear heat detector of the thermal event detection system, wherein the linear heat detector is operative to create, subsequent to being exposed to a temperature greater than or equal to a threshold temperature, a change in resistance along at least a portion of the linear heat detector; and initiating, by the safety controller, an action upon having detected the change in resistance.

In some embodiments, initiating the action comprises transmitting, in response to having detected the change in resistance of the linear heat detector, a command to a shut-off valve fluidly coupled to a fuel supply hose of the transport refrigeration unit, wherein the command is usable to turn the shut-off valve into an off position to shut-off transfer of fuel to an engine of the transport refrigeration unit. In other embodiments, the engine comprises an internal combustion engine. In still other embodiments, initiating the action comprises transmitting, in response to having detected the change in resistance of the linear heat detector, a notification to an on-board diagnostic communicatively coupled to the safety controller, wherein the notification is usable by the on-board diagnostic to indicate that the thermal event was detected by the safety controller In some embodiments, the linear heat detector is a two-core cable terminated by an end-of-line resistor. In other embodiments, detecting the change in resistance comprises detecting a short in the two-core cable. In still other embodiments, the threshold temperature is within a range of approximately 120° Celsius and approximately 130° Celsius. In another embodiment, the threshold temperature is approximately 125° Celsius. In yet other embodiments, the linear heat detector is affixed to an internally-facing side of a hood of the transport refrigeration unit.

In some embodiments, a first region surrounding a fuel supply system to transfer fuel to the engine via a fuel supply hose comprises a first hot zone and a second region surrounding an exhaust system to expel exhausted air from an engine of the transport refrigeration unit comprises a second hot zone, and wherein the linear heat detector is affixed to a hood of the transport refrigeration unit such that the linear heat detector is overlaid over each of the first and second hot zones when the hood is in a closed position.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
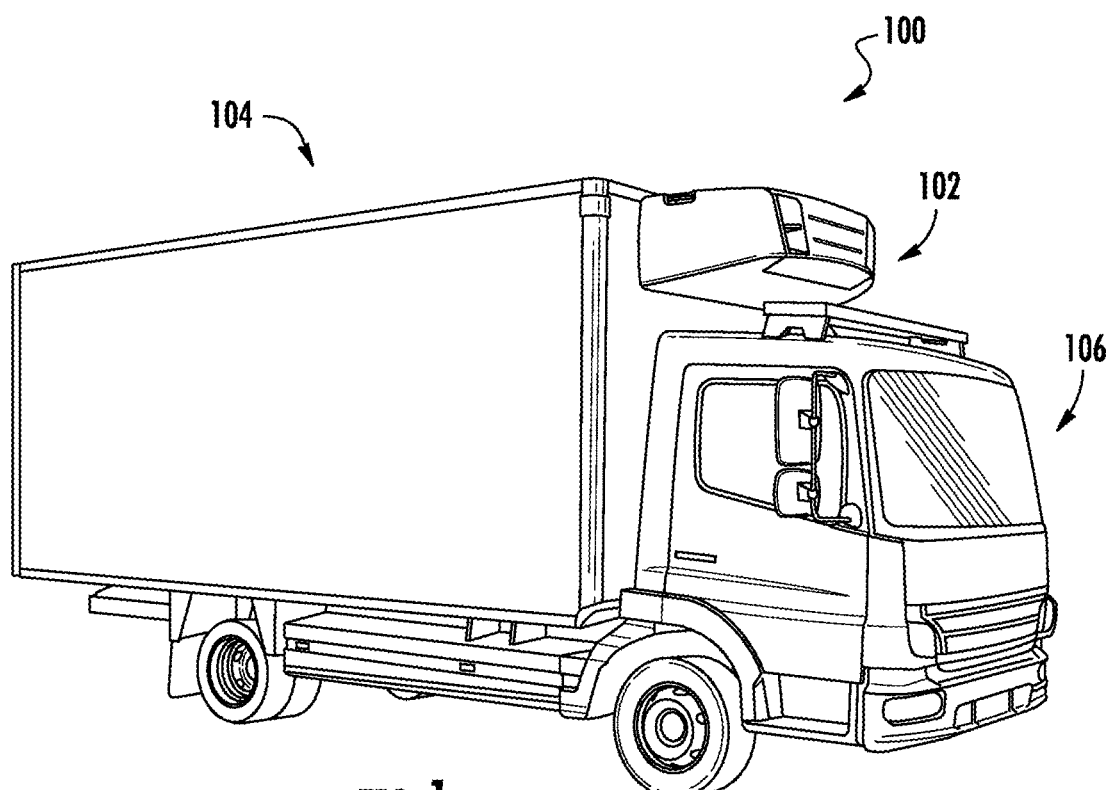
FIG. 1 is a diagram of an illustrative refrigerated transport system for thermal event detection that includes a transport refrigeration unit mounted on a semi-trailer.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a refrigerated transport system 100 that includes a transport refrigeration unit 102. In the illustrative refrigerated transport system 100, the transport refrigeration unit 102 is mounted to an exterior of a container 104. In use, the transport refrigeration unit 102 is usable to cool the atmosphere within the container 104, and thereby the freight transported therein. Such freight may include fruits, vegetables, meat, or other perishable goods that are intended to be kept fresh or frozen. The illustrative container 104 comprises a semi-trailer upon which the transport refrigeration unit 102 is mounted to an exterior wall thereof, such that the container 104 can be used to carry freight when attached to a tractor unit 106; however, it should be appreciated that the container 104 may be embodied as any type of enclosure, in other embodiments.

Figure 2:
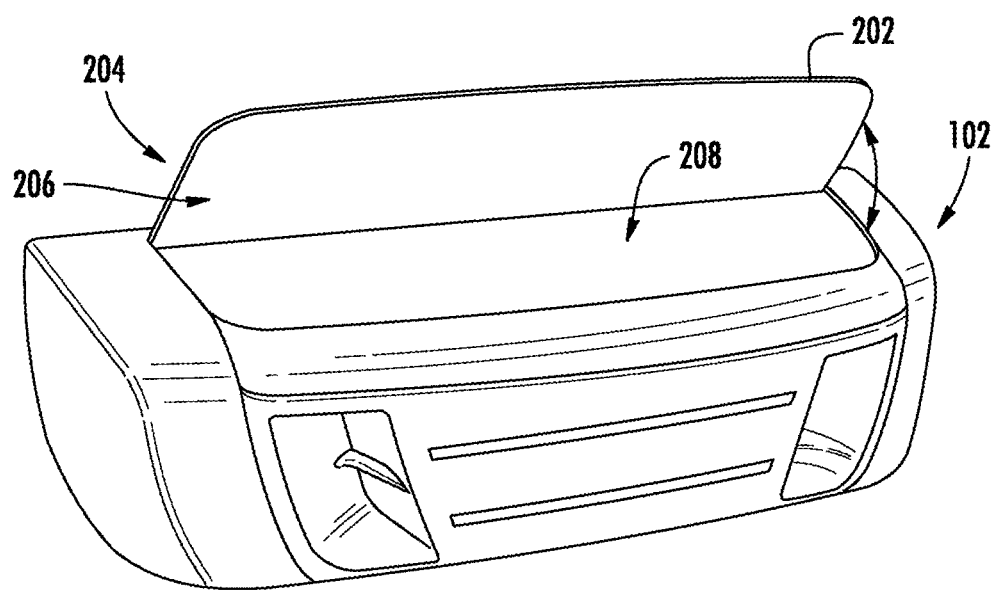
FIG. 2 is a diagram of the transport refrigeration unit of the refrigerated transport system of FIG. 1.

Referring now to FIG. 2, the transport refrigeration unit 102 includes an interior compartment 208 for housing the components of the transport refrigeration unit 102 and a hood 202 for accessing the interior compartment 208 (e.g., by opening the hood 202). As shown, the illustrative hood 202 is in an open position and includes an externally-facing side 204 and an internally-facing side 206. To cool the atmosphere within the container 104, various components of the transport refrigeration unit 102 are housed within the interior compartment 208. As such, when the hood 202 is in a closed position, the externally-facing side 204 may be exposed to the atmosphere, while the internally-facing side 206 resides above the components housed in the interior compartment 208.

Figure 4:
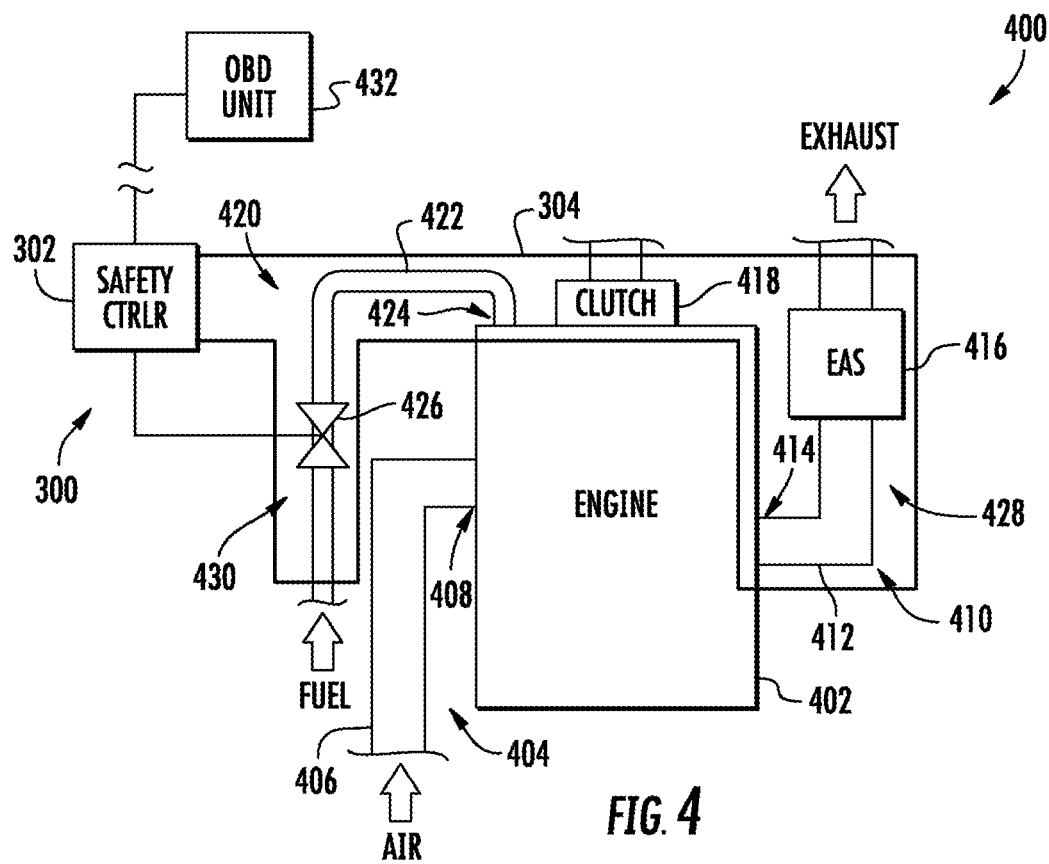
FIG. 4 is a block diagram of an illustrative embodiment of the linear heat detector of FIG. 3 superimposed over components housed in an interior compartment of the transport refrigeration unit of FIGS. 1 and 2.

The components of the transport refrigeration unit 102 housed in the interior compartment 208 include a refrigerant vapor compression system (not shown) and a power system (see, e.g., the power system 400 of FIG. 4). It should be appreciated that the refrigerant vapor compression system is configured to cool the atmosphere within the container 104. To do so, the refrigerant vapor compression system typically includes a compressor, a condenser, an expansion device, and an evaporator serially connected by refrigerant lines in a closed refrigerant circuit in accord with known refrigerant compression cycles.

The power system 400, which will be discussed in further detail below, is configured to operate as a power source for the refrigerant vapor compression system. In use, the power system 400 may provide the presence of three elements a fire needs to ignite: heat, fuel, and an oxidizing agent, usually oxygen. As such, a thermal event (e.g., overheating, a fire) may occur under certain conditions of the power system 400, such as the power system 400 producing an amount of heat at a sufficiently high temperature as to trigger a thermal event. In other words, the sufficiently high temperature heat combined with fuel and air may function as a catalyst for starting a fire in the interior compartment 208. Present technologies intended to prevent such thermal events include applying a thermal insulation to one or more components of the power system; however, a thermal event may still occur.

Figure 3:
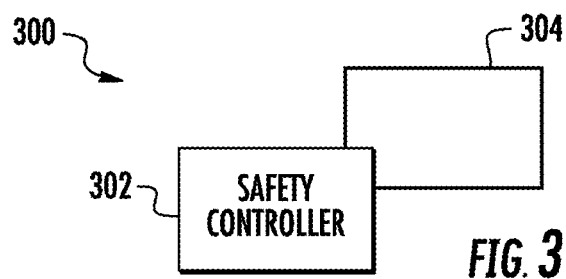
FIG. 3 is a block diagram of an illustrative embodiment of a thermal event detection system that includes a safety controller and a linear heat detector.

Referring now to FIG. 3, a thermal event detection system 300 is shown. The illustrative thermal event detection system 300 includes a safety controller 302 and a linear heat detector 304. The safety controller 302 may be embodied as any type of controller or microprocessor including hardware, software, firmware, or a combination thereof capable of performing the functions described herein. The linear heat detector 304 may be embodied as any type of cable(s) or wire(s) capable of performing the functions described herein.

In an illustrative example, the linear heat detector 304 may be embodied as a two-core cable terminated by an end-of-line resistor in which the two cores are separated by a polymer plastic designed to melt at a threshold temperature. Accordingly, in such embodiments, the safety controller 302 is configured to detect a thermal event by monitoring a resistance level through the linear heat detector 304. For example, the safety controller 302 may detect a change in resistance (e.g., a short) in the linear heat detector 304 as a result of section of the linear heat detector 304 having been exposed to a temperature greater than or equal to the threshold temperature causing the polymer plastic to melt between the two cores at some point along that section of the linear heat detector 304. It should be appreciated that, in some embodiments, the change in resistance may be based on a resistance tolerance threshold. In other words, in such embodiments, the change in resistance may be compared to the resistance tolerance threshold to determine whether such a change in resistance constitutes a thermal event. In some embodiments, the threshold temperature may reside within an inclusive range between approximately 120° Celsius and approximately 130° Celsius (e.g., approximately 125° Celsius).

Referring now to FIG. 4, an illustrative power system 400 includes an engine 402, an air intake system 404, an exhaust system 410, a fuel delivery system 420, and the thermal event detection system 300 housed in the interior compartment 208 of the transport refrigeration unit 102. The engine 402 may be embodied as any type of internal combustion engine in which the combustion of fuel occurs with an oxidizer (e.g., atmospheric oxygen) in a combustion chamber to apply direct force to some component of the engine 402 (e.g., a clutch 418), moving said component over a distance and thereby transforming chemical energy into useful mechanical energy (i.e., to provide power to the refrigerant vapor compression system). For example, the engine 402 may be embodied as, but not limited to, a reciprocating engine (e.g., a compression-ignition engine, a spark-ignition engine, etc.), a combustion turbine (e.g., a gas turbine engine), etc.

The engine 402 is configured to receive fuel (e.g., gasoline, diesel, natural gas, etc.), such as may be stored in a fuel storage tank (not shown), at a fuel inlet 424 via a fuel supply hose 422 of the fuel delivery system 420. Additionally, the engine 402 is configured to receive air (i.e., atmospheric air) at an air inlet 408 via an intake pathway 406 of the air intake system 404. As described previously, the engine 402 is configured to perform a combustion operation, which results in various particles and gasses being expelled. Accordingly, the engine 402 is configured to expel such particles and gasses through an exhaust outlet 414 into an exhaust pathway 412 of the exhaust system 410 for expulsion from the interior compartment 208 of the transport refrigeration unit 102.

The illustrative exhaust system 410 includes an exhaust after-treatment system 416 that is configured to reduce carbon monoxide, hydrocarbons, nitrous oxide, and other gaseous or particulate matter emissions. Certain elements of the exhaust after-treatment system 416, such as a particulate matter filter, require that they be operated at high temperatures at least a portion of the time. For example, in such embodiments in which the exhaust after-treatment system 416 includes a particulate matter filter, the power system 400 may be configured to burn the accumulated particulate off the particulate matter filter either passively through the use of a catalyst or actively increase exhaust gas temperatures to soot combustion temperatures (e.g., typically between 290° Celsius and 600° Celsius) to clean or regenerate the filter.

As described previously, one or more components of the power system 400 may produce enough heat to trigger a thermal event (e.g., overheating, a fire). For example, one or more components of the power system 400 may provide a fuel source (e.g., fuel from the fuel delivery system 420) capable of being ignited or combusting under certain heat conditions. Accordingly, one or more hot zones can be established around such components. In the illustrative power system 400, a hot zone, designated as hot zone 428, surrounds the exhaust system 410, while another hot zone, designated as hot zone 430, surrounds the fuel delivery system 420.

Figure 5:
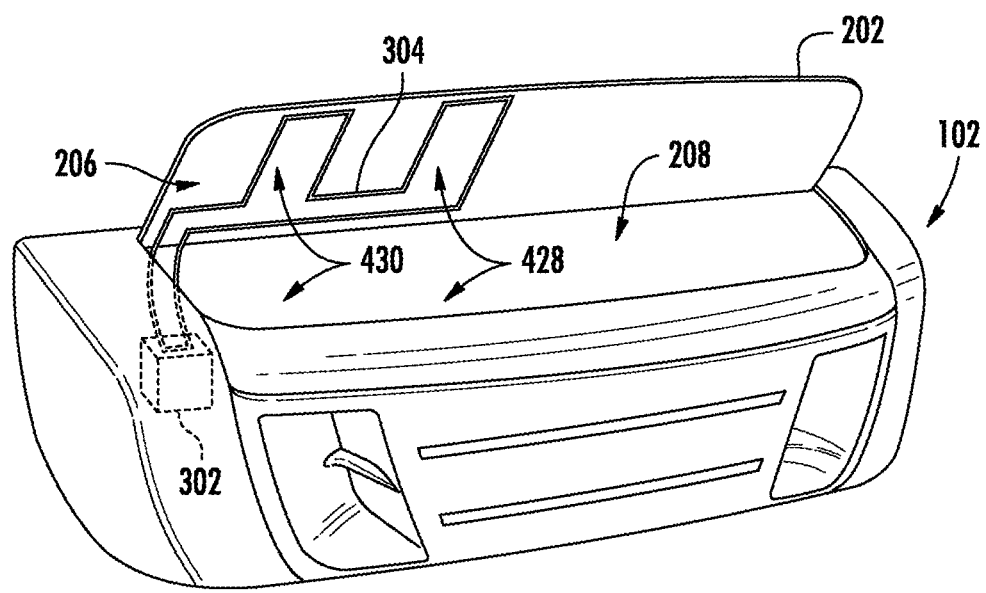
FIG. 5 is a diagram of the transport refrigeration unit of the refrigerated transport system of FIG. 1 that includes an illustrative linear heat detector that is affixed to a hood of the transport refrigeration unit and is communicatively coupled to a safety controller.

Referring now to FIG. 5, the illustrative linear heat detector 304 is affixed to the internally-facing side 206 of the hood 202 of the transport refrigeration unit 102 in a manner in which the linear heat detector 304 is capable of indicating the occurrence of a thermal event (e.g., overheating, a fire) in the interior compartment 208 (e.g., by causing a short along the path of the linear heat detector 304, as described previously). It should be appreciated that the linear heat detector 304 is affixed to the hood 202 such that the linear heat detector 304 surrounds the hot zones 428, 430 of the power system 400.

Referring back to FIG. 4, the linear heat detector 304 (i.e., affixed to the hood 202) is shown overlaying the power system 400 (i.e., the hood 202 is closed) and surrounding the hot zones 428, 430 in order for the linear heat detector 304 to be close enough in proximity to the components identified as being capable of causing or otherwise contributing to a thermal event. As described previously, the linear heat detector 304 is communicatively coupled to the safety controller 302 such that the safety controller 302 can monitor a resistance through the linear heat detector 304 to determine whether a thermal event has been detected.

The safety controller 302 is additionally configured to perform an action subsequent to the detection of a thermal event. For example, the safety controller 302 may be configured to control one or more fuel shut-off valves (e.g., the shut-off valve 426) to cut-off the fuel source of the thermal event. To do so, the safety controller 302 may transmit a command to the shut-off valve 426 indicating that the shut-off valve 426 should be placed in the closed position (i.e., fuel should not be allowed to flow through the shut-off valve 426). Accordingly, upon receiving the command, the shut-off valve 426 actuates the valve into a closed position to shut-off the flow of fuel through the shut-off valve 426. While the illustrative fuel delivery system 200 includes a single shut-off valve 426, additional shut-off valves may be present in other embodiments and/or placement of the shut-off valve(s) may be different in other embodiments. For example, in some embodiments, the one or more shut-off valve(s) may be located at an outlet of the fuel tank, an inlet to the refrigeration system, and/or another location along the fuel supply hose 422.

Additionally or alternatively, the safety controller 302 may be configured to transmit a notification (e.g., via a data packet) to an on-board diagnostic unit 432 upon detection of a thermal event. The on-board diagnostic unit 432 may be embodied as any combination of hardware, software, and/or firmware capable of monitoring the performance of one or more components of the refrigerated transport system 100 and provide status feedback to an operator (e.g., a driver, a technician, etc.) of the refrigerated transport system 100. Accordingly, the on-board diagnostic unit 432 may include an interface capable of displaying one or more indicator elements (e.g., graphics on a display, one or more warning lights, etc.) to provide a visual indication of the status of the respective component(s). In such embodiments, the notification transmitted by the safety controller 302 may be usable by the on-board diagnostic unit 432 to indicate to the operator via one or more indicator elements that a thermal event has been detected in the transport refrigeration unit 102.

While the illustrative embodiment is directed towards a transport refrigeration unit application, it should be appreciated that the features described herein may be implemented in other applications in which such thermal events may occur and detection thereof may be relevant. Additionally, while the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A transport refrigeration unit to cool an interior compartment of a container fluidly coupled to the transport refrigeration unit, the transport refrigeration unit comprising:

a power system to provide power to the transport refrigeration unit comprising:

an engine;

an exhaust system to expel exhausted air from the engine;

a fuel supply system to transfer fuel to the engine via a fuel supply hose, and a thermal event detection system comprising:

a safety controller; and a linear heat detector communicatively coupled to the safety controller, wherein the linear heat detector is operative to create, subsequent to being exposed to a temperature greater than or equal to a threshold temperature, a change in resistance along at least a portion of the linear heat detector, wherein the change in resistance is detectable by the safety controller, and wherein the safety controller is operative to initiate an action upon having detected the change in resistance.

2. The transport refrigeration unit of claim 1, wherein to initiate the action comprises to transmit, in response to having detected the change in resistance of the linear heat detector, a command to the shut-off valve that is usable to turn the shut-off valve into an off position to shut-off transfer of fuel to the engine.

3. The transport refrigeration unit of claim 1, wherein to initiate the action comprises to transmit, in response to having detected the change in resistance of the linear heat detector, a notification to an on-board diagnostic communicatively coupled to the safety controller, wherein the notification is usable by the on-board diagnostic to indicate that the thermal event was detected by the safety controller.

4. The transport refrigeration unit of claim 1, wherein the linear heat detector is a two-core cable terminated by an end-of-line resistor.

5. The transport refrigeration unit of claim 4, wherein to create the change in resistance comprises to create a short in the two-core cable.

6. The transport refrigeration unit of claim 1, wherein the threshold temperature is within a range of approximately 120° Celsius and approximately 130° Celsius.

7. The transport refrigeration unit of claim 6, wherein the threshold temperature is approximately 125° Celsius.

8. The transport refrigeration unit of claim 1, wherein the engine comprises an internal combustion engine.

9. The transport refrigeration unit of claim 1, wherein the linear heat detector is affixed to an internally-facing side of a hood of the transport refrigeration unit.

10. The transport refrigeration unit of claim 1, wherein a first region surrounding the fuel supply system comprises a first hot zone and a second region surrounding the exhaust system comprises a second hot zone, and wherein the linear heat detector is affixed to the hood of the transport refrigeration unit such that the linear heat detector is overlaid over each of the first and second hot zones when the hood is in a closed position.

11. A method for detecting a thermal event in a transport refrigeration unit, the method comprising:

detecting, by a safety controller of a thermal event detection system of the transport refrigeration unit, a change in resistance of a linear heat detector of the thermal event detection system, wherein the linear heat detector is operative to create, subsequent to being exposed to a temperature greater than or equal to a threshold temperature, a change in resistance along at least a portion of the linear heat detector; and initiating, by the safety controller, an action upon having detected the change in resistance.

12. The method of claim 11, wherein initiating the action comprises transmitting, in response to having detected the change in resistance of the linear heat detector, a command to a shut-off valve fluidly coupled to a fuel supply hose of the transport refrigeration unit, wherein the command is usable to turn the shut-off valve into an off position to shut-off transfer of fuel to an engine of the transport refrigeration unit.

13. The method of claim 11, wherein the engine comprises an internal combustion engine.

14. The method of claim 11, wherein initiating the action comprises transmitting, in response to having detected the change in resistance of the linear heat detector, a notification to an on-board diagnostic communicatively coupled to the safety controller, wherein the notification is usable by the on-board diagnostic to indicate that the thermal event was detected by the safety controller.

15. The method of claim 11, wherein the linear heat detector is a two-core cable terminated by an end-of-line resistor.

16. The method of claim 15, wherein detecting the change in resistance comprises detecting a short in the two-core cable.

17. The method of claim 11, wherein the threshold temperature is within a range of approximately 120° Celsius and approximately 130° Celsius.

18. The method of claim 17, wherein the threshold temperature is approximately 125° Celsius.

19. The method of claim 11, wherein the linear heat detector is affixed to an internally-facing side of a hood of the transport refrigeration unit.

20. The method of claim 11, wherein a first region surrounding a fuel supply system to transfer fuel to the engine via a fuel supply hose comprises a first hot zone and a second region surrounding an exhaust system to expel exhausted air from an engine of the transport refrigeration unit comprises a second hot zone, and wherein the linear heat detector is affixed to a hood of the transport refrigeration unit such that the linear heat detector is overlaid over each of the first and second hot zones when the hood is in a closed position.

* * * * *